United States Patent
Hedin

(10) Patent No.: US 10,538,440 B2
(45) Date of Patent: Jan. 21, 2020

(54) TREATMENT OF ORGANIC CONTAMINATED MATERIALS WITH MANGANESE OXIDE MEDIA

(71) Applicant: Hedin Environmental, Inc., Pittsburgh, PA (US)

(72) Inventor: Robert S. Hedin, Pittsburgh, PA (US)

(73) Assignee: Hedin Environmental, Inc., Pittsburgh, PA (US)

(*) Notice: Subject to any disclaimer, the term of this patent is extended or adjusted under 35 U.S.C. 154(b) by 222 days.

(21) Appl. No.: 15/447,611

(22) Filed: Mar. 2, 2017

(65) Prior Publication Data

US 2017/0253507 A1 Sep. 7, 2017

Related U.S. Application Data

(60) Provisional application No. 62/302,205, filed on Mar. 2, 2016.

(51) Int. Cl.

| | |
|---|---|
| *C01G 45/02* | (2006.01) |
| *C02F 1/66* | (2006.01) |
| *C02F 1/68* | (2006.01) |
| *C02F 1/72* | (2006.01) |
| *C02F 101/30* | (2006.01) |
| *C02F 101/34* | (2006.01) |
| *C02F 101/36* | (2006.01) |
| *C02F 101/38* | (2006.01) |

(52) U.S. Cl.
CPC .............. *C02F 1/72* (2013.01); *C01G 45/02* (2013.01); *C02F 1/66* (2013.01); *C02F 1/68* (2013.01); *C01P 2004/50* (2013.01); *C02F 2101/306* (2013.01); *C02F 2101/345* (2013.01); *C02F 2101/36* (2013.01); *C02F 2101/38* (2013.01); *C02F 2101/40* (2013.01); *C02F 2303/18* (2013.01)

(58) Field of Classification Search
CPC ........ C01G 45/02; C01P 2004/50; C02F 1/66; C02F 1/68; C02F 1/72; C02F 2101/306; C02F 2101/345; C02F 2101/36; C02F 2101/38; C02F 2101/40; C02F 2303/18
See application file for complete search history.

(56) References Cited

U.S. PATENT DOCUMENTS

| | | | | |
|---|---|---|---|---|
| 5,954,969 A | * | 9/1999 | Hedin | C02F 1/645 210/170.07 |
| 2009/0114606 A1 | * | 5/2009 | Sharkey, Jr. | C02F 1/66 210/758 |

OTHER PUBLICATIONS

Liu et al., "Removal of tetracycline from water by Fe—Mn binary oxide," Journal of Environmental Sciences,(2012), 24, 242-247. (Year: 2012).*
Forrez et al., "Influence of manganese and ammonium oxidation on the removal of 17 alpha-ethinylestradiol (EE2)," Water Research, 43, (2009), 77-86. (Year: 2009).*
Remucal et al., "A critical review of the reactivity of manganese oxides with organic contaminants," Environmental Science Processes and Impacts, 2014, 16, 1247-1266 (Year: 2014).*
Remucal et al., "A critical review of the reactivity of manganese oxide with organic contaminants," Environmental Science and Processes and Impacts, ESI, (2014),21 pages. (Year: 2014).*

* cited by examiner

*Primary Examiner* — Lucas A Stelling
(74) *Attorney, Agent, or Firm* — The Webb Law Firm

(57) ABSTRACT

A method of treating an organic contaminated material includes producing manganese oxide media in a first treatment system; and contacting the organic contaminated material with the manganese oxide media in a second treatment system. The manganese oxide media may be coated aggregate having a layer of manganese oxide. The manganese oxide media may be manganese oxide solids. The manganese oxide solids can be formed by removing at least a portion of the manganese oxide layer from the coated aggregate.

15 Claims, No Drawings

TREATMENT OF ORGANIC CONTAMINATED MATERIALS WITH MANGANESE OXIDE MEDIA

CROSS-REFERENCE TO RELATED APPLICATION

This application claims priority to U.S. Provisional Application No. 62/302,205 filed Mar. 2, 2016, which is herein incorporated by reference in its entirety.

BACKGROUND OF THE INVENTION

Field of the Invention

This invention relates to a method for making manganese oxide media that can be used in chemical processes and to treat organic contaminated materials, and to a method of treating organic contaminated materials.

Technical Considerations

Many environmental operations result in the production of contaminated materials, such as contaminated water, which must be treated or otherwise decontaminated before being released back into the environment. An example of one such operation is conventional coal mining, which can result in the production of drainage containing dissolved metal contaminants, such as manganese, iron, and aluminum.

Manganese is a common water contaminant that is most frequently treated by the addition of chemicals. The addition of chemicals promotes the oxidation of manganese (II) ($Mn^{2+}$) to manganese dioxide and oxyhydroxide minerals through pH adjustment (such as adding sodium hydroxide or calcium oxide) or oxidant addition (such as adding potassium permanganate or ozone). The chemical treatment of manganese contaminated water results in the formation of a low-density, chemically-diverse sludge that must be managed (i.e., collected and disposed of) at significant cost. An alternative treatment process involves the passive treatment of manganese contaminated coal mine drainage without the addition of chemicals. For example, manganese (II)-contaminated water is directed through a bed of aggregate, such as loose pieces of rocks or gravel. Reactions on the aggregate surfaces promote the formation of a layer of manganese oxide(s) on the aggregate surfaces. The process has both abiotic and biotic components. Additional manganese (II) in the contaminated water is adsorbed onto the previously formed manganese oxide layer on the aggregate and is oxidized to manganese oxide, thus increasing the thickness of the manganese oxide layer on the aggregate. Bacteria and fungi associated with the media promote the oxidation of manganese (II) through metabolic activities. Manganese oxide produced by a combination of biological and chemical processes is sometimes referred to as Biogenic Manganese Oxide (or BioMnOx). For acidic waters, the use of calcareous limestone aggregate is common because of its acid neutralizing capabilities. In cases where the water is naturally alkaline or limestone is not available, non-calcareous aggregate may be utilized.

The most common use of passive treatment for the removal of dissolved manganese from contaminated water is in the coalfields of the eastern U.S., where dozens of treatment systems have been constructed over the last twenty years. In these treatment systems, coal mine drainage flows through a bed of aggregate. These systems function through the precipitation of dissolved manganese onto the aggregate surfaces to form a coating layer of manganese oxide on the aggregate surfaces. Eventually, the accumulation of manganese oxide on the surfaces of the aggregate decreases the porosity of the aggregate bed to a point where its effectiveness is diminished. To maintain the effectiveness, the aggregate must be periodically cleaned or replaced with fresh aggregate. In both cases, wastes are generated that must be disposed of.

Manganese oxide minerals are recognized as potent remedial agents because of their strong oxidative capacities. The oxidative decomposition of a simple organic compound is generalized by the following reaction:

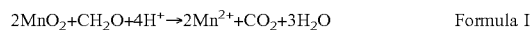

$$2MnO_2 + CH_2O + 4H^+ \rightarrow 2Mn^{2+} + CO_2 + 3H_2O \qquad \text{Formula I}$$

As shown in Formula I, manganese dioxide ($MnO_2$) is reduced to manganese (II) ($Mn^{2+}$) while an organic compound, represented by "$CH_2O$", is oxidized to carbon dioxide ($CO_2$).

Manganese oxide has been shown to oxidize and decompose a large variety of organic contaminants. Examples of such contaminants include antimicrobial agents, chelating agents, dyes, endocrine disruptors, flame retardants, pesticides, and various pharmaceutical agents including atrazine, glyphosate, ciprofloxacin, sulfadiazine, triclosan, chlorophene, fluoroquinolone, phenols, aromatic N-oxide, tetracyclines, lincosamides, macrolide, chlorophene, sulfonamide, Tetracycline, chlortetracycline, methylene blue, Bisphenol A, Bisphenol F, steroid estrogens, 17β-Estradiol, tetrabromobisphenol A, 2-mercaptobenzothiazole (MBT), carbamazepine, diclofenac, nonylphenol (NP), octylphenol (OP), 17a-ethinylestradiol, and many pharmaceuticals.

The use of manganese oxide for the treatment of organic contamination typically is accomplished by adding chemically-prepared manganese oxide to the contaminated water. The manganese oxide may be pure manganese oxide minerals or sand particles that have been coated with manganese oxide by a chemical precipitation process. The effectiveness of the treatment decreases as manganese (II) accumulates in solution and adsorbs preferentially onto manganese oxide, lessening the organic oxidative capabilities. These chemical treatment procedures do not include a means to reoxidize the released manganese (II) to manganese oxide in order to sustain the oxidative process.

Therefore, it would be desirable to devise a treatment system for organic contaminants that does not generate waste and which can be self-sustaining.

SUMMARY OF THE INVENTION

The invention provides a method of making manganese oxide media (e.g., manganese oxide solids, or coated aggregate comprising a layer of manganese oxide) in a first treatment system and using the manganese oxide media in a second treatment system to reduce or remove organic contaminants from an organic contaminated material. The first treatment system may be a passive or active treatment system that produces the manganese oxide media. The second treatment system uses the manganese oxide media to remove organic contaminants from a contaminated material, such as water or soil.

For example, the first treatment system may be a passive treatment system for treating coal mine drainage.

For example, the second treatment system may be an aqueous system having one or more organic contaminants.

The manganese oxide media may comprise an aggregate having a manganese oxide coating or layer produced in the first treatment system.

The manganese oxide media may comprise manganese oxide solids or particles.

For example, the manganese oxide solids can be produced by removing at least a portion of the manganese oxide layer from the coated aggregate produced in the first treatment system. For example, the coated aggregate can be removed from the first treatment system and at least a portion of the manganese oxide layer removed by physical or chemical processing. For example, at least a portion of the manganese oxide layer can be removed by using a stream of pressurized water, such as from a hose, to wash at least a portion of the manganese oxide layer off of the coated aggregate. The aggregate with the remainder of the manganese oxide layer still adhered thereto can be returned to the first treatment system for continued use.

A treatment system of the invention comprises manganese oxide media (e.g., aggregate coated with a layer of manganese oxide, or manganese oxide solids or particles) produced in a first treatment system. The first treatment system can be, for example, a passive coal mine drainage treatment system. A contaminated material comprising organic contaminants is exposed to the manganese oxide media in a second treatment system such that at least a portion of the organic contaminants is removed from the contaminated material. For example, the contaminated material may be an aqueous material, such as organic contaminated water.

A method of treating contaminated material comprising organic contaminants comprises exposing aggregate to coal mine drainage containing manganese ions in a first treatment system, such that manganese ions adsorb and oxidize on the surface of the aggregate to form coated aggregate having a layer of manganese oxide; removing the coated aggregate from the first treatment system; placing the coated aggregate into a second treatment system; and exposing the coated aggregate in the second treatment system to a contaminated material comprising organic contaminants, such that at least a portion of the organic contaminants is removed from the contaminated material. For example, the contaminated material may be an aqueous material, such as organic contaminated water.

A method of treating a contaminated material comprising organic contaminants comprises exposing aggregate to coal mine drainage containing manganese ions in a first treatment system, such that manganese ions adsorb and oxidize on the surface of the aggregate to form coated aggregate having a layer of manganese oxide; removing the coated aggregate from the first treatment system; removing at least a portion of the manganese oxide layer from the coated aggregate to produce manganese oxide solids; placing the manganese oxide solids into a second treatment system; and exposing the manganese oxide solids in the second treatment system to a contaminated material comprising organic contaminants, such that at least a portion of the organic contaminants is removed from the contaminated material. For example, the contaminated material may be an aqueous material, such as organic contaminated water. The coated aggregate having the portion of the manganese oxide layer not removed to form the manganese oxide solids can be returned to the first treatment system.

The invention also provides a method of making manganese oxide media (e.g., coated aggregate comprising a layer of manganese oxide, or manganese oxide solids) to remove organic contaminants from a contaminated material in a unitary system.

In a unitary system, a method of treating a contaminated material comprising organic contaminants and manganese ions comprises exposing aggregate to coal mine drainage containing organic contaminants and manganese ions, such that manganese ions adsorb and oxidize on the surface of the aggregate to form coated aggregate having a layer of manganese oxide. After formation of the coated aggregate, continued exposure of the contaminated material to the coated aggregate causes at least a portion of the organic contaminants to be removed from the contaminated material, as well as additional manganese ions. For example, the contaminated material may be an aqueous material, such as organic contaminated water.

In a unitary system, prior to formation of the coated aggregate having a layer of manganese oxide of sufficient amount to remove organic contaminants, the organic contaminants in the contaminated material can be treated or removed by conventional methods, such as the addition of chemicals. After the formation of a sufficient layer of manganese oxide on the coated aggregate to remove organic contaminants, the addition of chemicals to treat or remove the organic contaminants can be reduced or stopped.

DESCRIPTION OF THE INVENTION

The invention comprises, consists of, or consists essentially of the following aspects of the invention, in any combination.

For ease of discussion, all oxides and hydroxides of manganese are referred to collectively herein as "manganese oxide" or "$MnO_x$", despite the valance state of manganese. Thus, the term "manganese oxide" includes stoichiometric manganese oxide, stoichiometric manganese dioxide, and any other suboxides or superoxides of manganese. Examples of such manganese oxides include manganese (II) oxide, manganese (II, III) oxide, manganese (III) oxide, manganese dioxide, manganese (VI) oxide, and manganese (VII) oxide.

As used herein, the term "manganese oxide media" refers to both an aggregate having a layer comprising "manganese oxide" and also to "manganese oxide solids". By "manganese oxide solids" is meant solid material or particles produced by removing at least a portion of a manganese oxide layer from a coated aggregate.

As will be appreciated, coal mine drainage may contain metals other than manganese. Examples of such other metals include iron and aluminum. These other metals may co-precipitate in the aggregate bed, and/or may be incorporated with the manganese oxides, and/or may precipitate separately. Thus, the manganese oxide layer on the coated aggregate, and, hence the manganese oxide media, may not be pure manganese oxide but may also contain oxides or hydroxides of one or more other materials present in the first treatment system. For example, the manganese oxide media may contain, in addition to manganese oxide, oxides or hydroxides of one or more other metals, such as iron or aluminum. For example, the manganese oxide media also may contain oxides or hydroxides of aluminum.

In a first example, the present invention relates to a method for making manganese oxide media in a first treatment system to use in a second treatment system.

The manganese oxide media can comprise an aggregate having a coating or layer of manganese oxide. The aggregate can be, for example, rocks, stones, or other materials conventionally used in treatment beds. Examples of aggregate include calcareous and non-calcareous materials. For example, the aggregate can comprise limestone aggregate or granite aggregate. The coated aggregate comprises a manganese oxide layer comprising manganese oxide minerals, manganese oxyhydroxide minerals, microbial biofilms, or mixtures of any of the foregoing capable of oxidizing manganese. As discussed above, the manganese oxide layer may include oxides and/or hydroxides of one or more other metals.

The manganese oxide media can comprise manganese oxide solids. The manganese oxide solids can be produced by removing at least a portion of the manganese oxide layer from the coated aggregate produced in the first treatment system. The manganese oxide solids can be removed and collected for use in the second treatment system.

The first treatment system can be, for example, a coal mine drainage treatment system. The aggregate can comprise limestone aggregate. The contaminated coal mine drainage can be passively treated by flowing through a bed of the limestone aggregate by the force of gravity. Contaminants are removed from the coal mine drainage by precipitation. For example, dissolved manganese precipitates onto the surface of the limestone aggregate to form a layer of manganese oxide on the surface of the aggregate. Iron, aluminum, and other metals co-precipitate in the bed and are incorporated with the manganese oxides or precipitate separately and can be flushed out.

The first treatment system can also be an active treatment system comprising a continuously flowing aqueous system. Manganese ions can be added to the aqueous system through the addition of a manganese salt. An example of one such manganese salt is manganese chloride. Of course, other manganese salts could be used, for example, manganese carbonate, manganese sulfate, and manganese nitrate.

The manganese oxide media formed in the first treatment system can be used in a second treatment system to treat a material contaminated with organic contaminants. The organic contaminants react with the manganese oxide media to oxidize and/or mineralize the organic contaminants to remove and/or decompose the organic compounds. During this process, released manganese (II) is reoxidized. The material can be organic contaminated water, organic contaminated soil, or organic contaminated substrates. Examples of organic contaminants that can be removed include sulfonic acid, atrazine, glyphosate, ciprofloxacin, sulfadiazine, triclosan, chlorophene, fluoroquinolone, phenols, aromatic N-oxide, tetracyclines, lincosamides, macrolide, chlorophene, sulfonamide, Tetracycline, chlortetracycline, methylene blue, Bisphenol A, Bisphenol F, steroid estrogens, 17β-Estradiol, tetrabromobisphenol A, 2-mercaptobenzothiazole (MBT), carbamazepine, diclofenac, nonylphenol (NP), octylphenol (OP), 17a-ethinylestradiol, mixtures of any of the foregoing, and other contaminants containing organic bonds.

The second treatment system treats organic contaminants with the manganese oxide media produced in the first treatment system. The treatment process of the invention differs from other treatment processes because the manganese oxide media is capable of adsorbing and rapidly reoxidizing manganese (II) released during oxidation of the organic contaminants. This process sustains the manganese oxide media's capacity for organic oxidation. The generalized reaction is below.

$$CH_2O + MnO\text{-solid} \rightarrow CO_2 + Mn^{2+}$$ Formula II $$Mn^{2+} + Mn\text{-solid} \rightarrow MnO\text{-solid-}Mn^{2+}$$ Formula III $$MnO\text{-solid-}Mn^{2+} + O_2 \rightarrow MnO\text{-solid-}MnO$$ Formula IV In the described system, manganese oxide is not consumed. The manganese oxide media acts as a heterogeneous catalyst that does not lose its capacity for organic compound degradation, as long as there is oxygen to support the reoxidation of manganese (II).

In an alternate exemplary system, the treatment system could be a unitary treatment system. Manganese oxide media (e.g., coated aggregate comprising a layer of manganese oxide) can be produced by exposing aggregate to coal mine drainage containing manganese ions and organic contaminants. During an initial period of time, dissolved manganese precipitates onto the surface of the aggregate to form a layer of manganese oxide on the surface of the aggregate. During the initial manganese deposition period, organic contaminants can be treated with conventional methods, such as chemical addition. After the initial period of time when a sufficient layer of manganese oxide has formed on the surfaces of the aggregate, organic contaminants in a contaminated medium react with the manganese oxide media to oxidize and/or mineralize the organic contaminants to remove and/or decompose the organic compounds. Thereafter, the conventional treatment methods can be reduced or discontinued.

In the unitary system, additional manganese can be added to the system, if desired, to enhance the formation of the manganese oxide layer on the coated media and/or to maintain or sustain the organic decomposition.

The pH of the water in the first treatment system and/or the second treatment system is preferably maintained in the range of 6 to 8, such as in the range of 6.5 to 7.5. Coal mine drainage is commonly acidic. Therefore, utilizing an aggregate comprising a calcareous material, such as limestone, helps to maintain the pH of the treatment system in the desired range. If a non-calcareous aggregate is used, the pH can be maintained by adding one or more alkaline materials to the treatment system. Examples of such alkaline materials include sodium hydroxide and calcium oxide.

Example

Coated aggregate was obtained from a passive treatment system where manganese-contaminated coal mine drainage had been passively treated with a bed of limestone aggregate for five years. The coated aggregate contained a layer of manganese oxide and microbial growth. Experimental cells were constructed comprising an open plastic tub filled with approximately 750 cubic centimeters (cc) of the coated aggregate. Contaminated groundwater was obtained from an EPA superfund site that was contaminated with 28,000 micrograms per liter (µg/L) of 2,3',4-trihydroxydiphenyl (THD). Approximately 375 milliliters (ml) of the contaminated water was added to the experimental cells and exposed to the coated aggregate for periods of 24 and 48 hours. A control was maintained under the same experimental conditions and time period but without any coated aggregate. The pH of the systems was in the range of 6.5 to 7.5.

Table 1 shows the experimental results.

TABLE 1

Effect of $MnO_x$ coated media on THD, $Mn^D$, and total organic carbon.

| | THD µg/L | $Mn^D$ µg/L | TOC µg/L |
|---|---|---|---|
| Raw | 28,000 | 5,900 | 56,000 |
| Control (no coated aggregate) | 26,000 | 6,000 | 50,000 |
| 24 hr contact | 1,250 | 133 | 16,000 |
| 48 hr contact | 290 | 380 | 12,000 |

THD = 2,3',4-Trihydroxydiphenyl;
$Mn^D$ = dissolved Mn;
TOC = total organic carbon The control had limited effect on any chemical parameters. The reactive coated aggregate decreased THD and dissolved manganese to very low concentrations. The total organic carbon, which is comprised of THD and other non-contaminant organic compounds, was decreased by 40,000 to 44,000 µg/L, indicating that organic compounds in addition to THD were mineralized by the $MnO_x$ coated aggregate. Mineralization of 40,000 µg/L of organic carbon by manganese oxide resulted in the release of approximately 360,000 µg/L manganese (II) (Formula I). The lack of accumulation of manganese (II) demonstrates the effectiveness of the coated aggregate in reoxidizing the released manganese.

The invention also can be described in the following numbered clauses.

Clause 1: A method of treating an organic contaminated material, comprising producing manganese oxide media in a first treatment system, and contacting the organic contaminated material with the manganese oxide media in a second treatment system.

Clause 2: The method of clause 1, wherein the manganese oxide media comprises manganese oxide solids.

Clause 3: The method of clause 1, wherein the manganese oxide media comprises aggregate having a coating layer of manganese oxide.

Clause 4: The method of any of clauses 1 to 3, wherein the aggregate comprises a calcareous aggregate, such as limestone.

Clause 5: The method of any of clauses 1 to 3, wherein the aggregate comprises a non-calcareous aggregate, such as granite.

Clause 6: The method of any of clauses 1 to 5, wherein the manganese oxide media comprises calcareous or non-calcareous aggregate comprising a coating layer comprising manganese oxide, manganese oxide minerals, manganese oxyhydroxide minerals, microbial biofilms, and mixtures of any of the foregoing capable of oxidizing manganese.

Clause 7: The method of any of clauses 1 to 6, wherein the first treatment system is a coal mine drainage treatment system.

Clause 8: The method of clause 7, wherein in the first treatment system contaminated coal mine drainage is passively treated by flowing through a bed of aggregate by the force of gravity.

Clause 9: The method of clause 7, wherein in the first treatment system contaminated coal mine drainage is passively treated by flowing through a bed of aggregate by the force of pumps.

Clause 10: The method of clause 1, wherein manganese is added to the first treatment system through the addition of a manganese salt.

Clause 11: The method of clause 10, wherein the manganese salt is selected from the group consisting of: manganese chloride, manganese carbonate, manganese sulfate, and manganese nitrate.

Clause 12: The method of clauses 1 or 2, wherein manganese oxide solids are produced by removing at least a portion of the manganese oxide coating layer from the coated aggregate.

Clause 13: The method of any of clauses claims 1 to 12, wherein the second treatment system comprises the manganese oxide media and a contaminated material comprising organic contaminants.

Clause 14: The method of clause 13, wherein at least a portion of the organic contaminants are removed from the contaminated medium by reacting with the manganese oxide media to decompose the organic contaminants via oxidative decomposition.

Clause 15: The method of clause 14, wherein manganese (II) released during the oxidative decomposition reaction is reoxidized.

Clause 16: The method of any of clauses 13 to 15, wherein the contaminated material comprises organic and/or metal contaminated water.

Clause 17: The method of any of clauses 13 to 15, wherein the contaminated material comprises organic and/or metal contaminated soil.

Clause 18: The method of any of clauses 13 to 15, wherein the contaminated material comprises organic and/or metal contaminated substrates.

Clause 19: The method of any of clauses 1 to 18, wherein the organic contaminants comprise at least one of sulfonic acid, 2,3',4-Trihydroxydiphenyl, atrazine, glyphosate, ciprofloxacin, sulfadiazine, triclosan, chlorophene, fluoroquinolone, phenols, aromatic N-oxide, tetracyclines, lincosamides, macrolide, chlorophene, sulfonamide, Tetracycline, chlortetracycline, methylene blue, Bisphenol A, Bisphenol F, steroid estrogens, 17β-Estradiol, tetrabromobisphenol A, 2-mercaptobenzothiazole (MBT), carbamazepine, diclofenac, nonylphenol (NP), octylphenol (OP), 17a-ethinylestradiol, and mixtures of any of the foregoing.

Clause 20: A method of treating a contaminated material comprising organic contaminants, comprising: exposing aggregate to coal mine drainage containing manganese ions in a first treatment system such that the manganese ions adsorb and oxidize on the surface of the aggregate to form coated aggregate media having a layer of manganese oxide; removing at least a portion of the coated aggregate from the first treatment system; placing at least a portion of the coated aggregate into a second treatment system; and exposing the coated aggregate in the second treatment system to the contaminated material comprising organic contaminants such that at least a portion of the organic contaminants are removed from the contaminated material.

Clause 21: A method of treating a contaminated material comprising organic contaminants, comprising: exposing aggregate to coal mine drainage containing manganese ions such that the manganese ions adsorb and oxidize on the surface of the aggregate to form coated aggregate having a layer of manganese oxide; and exposing the coated aggregate to the contaminated material comprising organic contaminants such that at least a portion of the organic contaminants are removed from the contaminated material.

Clause 22: A method of treating a contaminated material comprising manganese ions and organic contaminants, comprising: exposing aggregate to contaminated coal mine drainage containing manganese ions and organic contaminates such that at least a portion of the manganese ions adsorb and oxidize on the surface of the aggregate to form coated aggregate having a layer of manganese oxide; and continuing to expose the contaminated material to the coated aggregate such that at least a portion of the organic contaminants and at least a portion of the manganese ions are removed from the contaminated material.

Clause 23: The method of clause 22, including treating or removing at least a portion of the organic contaminants from the contaminated material by the addition of chemicals prior to formation of the coated aggregate.

Clause 24: A method of treating a contaminated material comprising organic contaminants, comprising: exposing aggregate to coal mine drainage containing manganese ions in a first treatment system such that the manganese ions adsorb and oxidize on the surface of the aggregate to form a manganese oxide coating layer; removing at least a portion of the manganese oxide coating layer from the first treatment system to form manganese oxide solids; placing the manganese oxide solids into a second treatment system; and exposing the manganese oxide solids in the second treatment system to the contaminated material comprising organic contaminants such that at least a portion of the organic contaminants are removed from the contaminated material.

Clause 25: The method of any of clauses 1 to 24, wherein the manganese oxide media comprises manganese oxide and an oxide or hydroxide of at least one other metal.

Clause 25: The method of clause 25, wherein the at least one other metal is selected from iron and aluminum, preferably aluminum.

The invention provides a new and useful method of utilizing the coated aggregate formed in the treatment of coal mine drainage, which would otherwise simply be disposed of as waste, to treat organic contaminated materials in another treatment system.

What is claimed is:

1. A method of treating a contaminated material comprising organic contaminants, comprising:
    exposing aggregate to coal mine drainage containing manganese ions in a first treatment system such that the manganese ions adsorb and oxidize on the surface of the aggregate to form coated aggregate having a layer of manganese oxide;
    removing at least a portion of the coated aggregate from the first treatment system;
    placing at least a portion of the removed coated aggregate into a second treatment system; and
    exposing the coated aggregate in the second treatment system to a contaminated material comprising organic contaminants such that at least a portion of the organic contaminants are removed from the contaminated material.

2. A method of treating a contaminated material comprising organic contaminants, comprising:
    exposing aggregate to coal mine drainage containing manganese ions in a first treatment system such that the manganese ions adsorb and oxidize on the surface of the aggregate to form a coated aggregate having a manganese oxide coating layer;
    removing at least a portion of the manganese oxide coating layer from the coated aggregate to form manganese oxide solids;
    placing the manganese oxide solids into a second treatment system; and
    exposing the manganese oxide solids in the second treatment system to a contaminated material comprising organic contaminants such that at least a portion of the organic contaminants are removed from the contaminated material.

3. The method of claim 2, wherein the aggregate comprises a calcareous aggregate or a non-calcareous aggregate.

4. The method of claim 2, wherein the aggregate comprises a coating layer comprising manganese oxide minerals, manganese oxyhydroxide minerals, microbial biofilms, and mixtures of any of the foregoing capable of oxidizing manganese.

5. The method of claim 2, including maintaining the pH in at least one of the first treatment system and the second treatment system in the range of 6.5 to 7.5.

6. The method of claim 2, wherein manganese is added to the first treatment system through the addition of a manganese salt.

7. The method of claim 6, wherein the manganese salt is selected from the group consisting of manganese chloride, manganese carbonate, manganese sulfate, and manganese nitrate.

8. The method of claim 2, wherein at least a portion of the organic contaminants are removed from the organic contaminated material by reacting with the manganese oxide media to decompose the organic contaminants via oxidative decomposition.

9. The method of claim 8, wherein manganese (II) released during the oxidative decomposition reaction is reoxidized.

10. The method of claim 2, wherein the contaminated material comprises organic and/or metal contaminated water.

11. The method of claim 2, wherein the manganese oxide coating layer comprises manganese oxide and an oxide or hydroxide of at least one other metal.

12. The method of claim 11, wherein the at least one other metal is selected from iron and aluminum.

13. A method of treating a contaminated material comprising organic contaminants, comprising:
    exposing aggregate to coal mine drainage containing manganese ions in a first treatment system such that the manganese ions adsorb and oxidize on the surface of the aggregate to form a coated aggregate having a manganese oxide coating layer;
    removing at least a portion of the manganese oxide coating layer from the coated aggregate to form manganese oxide solids;
    placing the manganese oxide solids into a second treatment system;
    exposing the manganese oxide solids in the second treatment system to a contaminated material comprising organic contaminants such that at least a portion of the organic contaminants are removed from the contaminated material; and
    returning the aggregate having the at least a portion of the manganese oxide coating layer removed to form the manganese oxide solids to the first treatment system.

14. A method of treating a contaminated material comprising organic contaminants, comprising:
    exposing a contaminated material comprising organic contaminants to manganese oxide solids such that at least a portion of the organic contaminants is removed from the contaminated material, wherein the manganese oxide solids have been removed from aggregate exposed to coal mine drainage.

15. The method of claim 14, wherein manganese ions adsorb and oxidize on the surface of the aggregate to form a coated aggregate having a manganese oxide coating layer.

\* \* \* \* \*